United States Patent
de Freitas Cunha et al.

(10) Patent No.: US 11,681,814 B2
(45) Date of Patent: Jun. 20, 2023

(54) AUTOMATIC AND CUSTOMIZED DATA DELETION ACTIONS

(71) Applicant: International Business Machines Corporation, Armonk, NY (US)

(72) Inventors: Renato Luiz de Freitas Cunha, Sao Paulo (BR); Bruno Silva, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/519,907

(22) Filed: Jul. 23, 2019

(65) Prior Publication Data
US 2021/0026973 A1    Jan. 28, 2021

(51) Int. Cl.
| G06F 21/60 | (2013.01) |
| G06F 16/29 | (2019.01) |
| H04L 9/40 | (2022.01) |
| H04W 4/02 | (2018.01) |
| H04W 88/02 | (2009.01) |

(52) U.S. Cl.
CPC ............ *G06F 21/604* (2013.01); *G06F 16/29* (2019.01); *G06F 21/602* (2013.01); *H04W 4/023* (2013.01); *H04W 88/02* (2013.01)

(58) Field of Classification Search
CPC ...... G06F 21/604; G06F 16/29; G06F 21/602; H04W 4/023; H04W 88/02
USPC .......................................................... 726/26
See application file for complete search history.

(56) References Cited

U.S. PATENT DOCUMENTS

| 6,564,307 | B1* | 5/2003 | Micka | G06F 21/62 |
| | | | | 711/103 |
| 7,054,624 | B2* | 5/2006 | Cocita | H04M 1/2757 |
| | | | | 455/419 |
| 7,159,120 | B2* | 1/2007 | Muratov | G06F 21/575 |
| | | | | 713/193 |
| 7,543,144 | B2* | 6/2009 | Rensin | G06F 21/313 |
| | | | | 713/164 |
| 7,865,172 | B2* | 1/2011 | Blair | G06F 11/1458 |
| | | | | 455/411 |

(Continued)

FOREIGN PATENT DOCUMENTS

| EP | 3236640 B1 | 10/2017 | |
| WO | 2019/041143 A1 | 3/2019 | |
| WO | WO-2019076380 A1 * | 4/2019 | ............. G08B 21/24 |

OTHER PUBLICATIONS

Jon Meling; Gohcci: Protecting sensitive data on stolen or misplaced mobile devices; IEEE:2009; pp. 348-354.*

(Continued)

*Primary Examiner* — Monjur Rahim
(74) *Attorney, Agent, or Firm* — Scully, Scott, Murphy & Presser, P.C.; Peter J. Edwards

(57) ABSTRACT

A mobile device may generate a plurality of signals based on sensor data received from a plurality of sensors associated with the mobile device. Based on a logic combination of the plurality of signals, the mobile device may detect its status indicating one of different scenarios. Based on the detected mobile device status and a configured policy, the mobile device may determine a type of deletion action for deleting data on the mobile device. The mobile device may perform the determined type of deletion action.

18 Claims, 8 Drawing Sheets

(56) References Cited

U.S. PATENT DOCUMENTS

| | | | | |
|---|---|---|---|---|
| 8,012,219 | B2* | 9/2011 | Mendez | G06F 21/604 |
| | | | | 726/35 |
| 8,112,807 | B2* | 2/2012 | Taylor | G06F 21/554 |
| | | | | 726/26 |
| 8,810,392 | B1* | 8/2014 | Teller | G08B 21/24 |
| | | | | 340/539.32 |
| 10,192,039 | B2* | 1/2019 | Huang | H04W 12/03 |
| 2002/0121976 | A1* | 9/2002 | Huang | G08B 3/10 |
| | | | | 340/571 |
| 2007/0038680 | A1* | 2/2007 | Casey | G06F 21/88 |
| 2010/0273452 | A1* | 10/2010 | Rajann | G06F 21/88 |
| | | | | 455/411 |
| 2011/0218965 | A1* | 9/2011 | Lee | G06F 21/88 |
| | | | | 707/640 |
| 2011/0252232 | A1* | 10/2011 | De Atley | G06F 21/6218 |
| | | | | 713/165 |
| 2015/0324616 | A1* | 11/2015 | Alarabi | H04L 63/0876 |
| | | | | 726/25 |
| 2016/0253487 | A1* | 9/2016 | Sarkar | G06F 21/88 |
| | | | | 726/7 |
| 2016/0283698 | A1* | 9/2016 | Huang | G06F 21/32 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

Konsolakis, K., et al., "Human Behaviour Analysis through Smartphones", Proceedings 2018, Oct. 30, 2018, 11 pages, www.mdpi.com/journal/proceedings.

https://www.icloud.com/#find, printed on Jul. 23, 2019, 1 page.

"Travel Mode", printed on Jul. 23, 2019, 5 pages, https://support.1password.com/travelmode/.

"Google Find My Device", printed on Jul. 23, 2019, 7 pages, https://play.google.com/store/apps/details?id=com.google.android.apps.adm.

Seifert, J., et al., "TreasurePhone: Context-Sensitive User Data Protection on Mobile Phones", International Conference on Pervasive Computing, Pervasive 2010: Pervasive Computing, May 17-20, 2010, 8 pages http://141.84.8.93/pubdb/publications/pub/seifert2010pervasive/seifert2010pervasive.pdf.

"The Mobile Device Suite", printed on Jul. 23, 2019, 9 pages, https://preyproject.com/features/.

Meling, J., et al., "Gohcci: Protecting sensitive data on stolen or misplaced mobile devices", 2009 Tenth International Conference on Mobile Data Management: Systems, Services and Middleware, May 18-20, 2009, IEEE Computer Society, pp. 348-354.

Yu, X., et al., "Remotely Wiping Sensitive Data on Stolen Smartphones", ASIA CCS'14, Jun. 4-6, 2014, pp. 537-542, Kyoto, Japan.

* cited by examiner

AUTOMATIC AND CUSTOMIZED DATA DELETION ACTIONS

The present application relates generally to computers and computer applications, and more particularly to automatic and customized data deletion actions, for example, on a mobile device.

BACKGROUND

Mobile devices such as smartphones and laptops store multitude of data. If such mobile devices are lost or stolen, the data stored on the devices should be deleted so that the data is not compromised. In some instances, the user of the mobile device can delete such data remotely over the Internet. However, if data storage on the mobile device had been removed before the user can act, or the mobile device is not connected to a network, remote deletion may not work. In other instances, the user may find the lost mobile device only after the user has deleted the data remotely. In such cases, the mobile device may not be able to recover the deleted data easily.

BRIEF SUMMARY

A computer-implemented method, in one aspect, may include generating a plurality of signals based on sensor data received from a plurality of sensors associated with a mobile device. The method may also include, based on a logic combination of the plurality of signals, detecting a mobile device status indicating one of different scenarios. The method may further include, based on the detected mobile device status indication one of different scenarios and a configured policy, determining a type of deletion action for deleting data on the mobile device, wherein the type of deletion action determined can be different for the different scenarios. The method may further include performing the determined type of deletion action.

A mobile device, in one aspect, may include a processor. A memory device may be coupled with the processor. The processor may be operable to generate a plurality of signals based on sensor data received from a plurality of sensors associated with a mobile device. The processor may be further operable to, based on a logic combination of the plurality of signals, detect a mobile device status indicating one of different scenarios. The processor may be further operable to, based on the detected mobile device status indication one of different scenarios and a configured policy, determine a type of deletion action for deleting data on the mobile device. The type of deletion action determined can be different for the different scenarios. The processor may be further operable to perform the determined type of deletion action.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
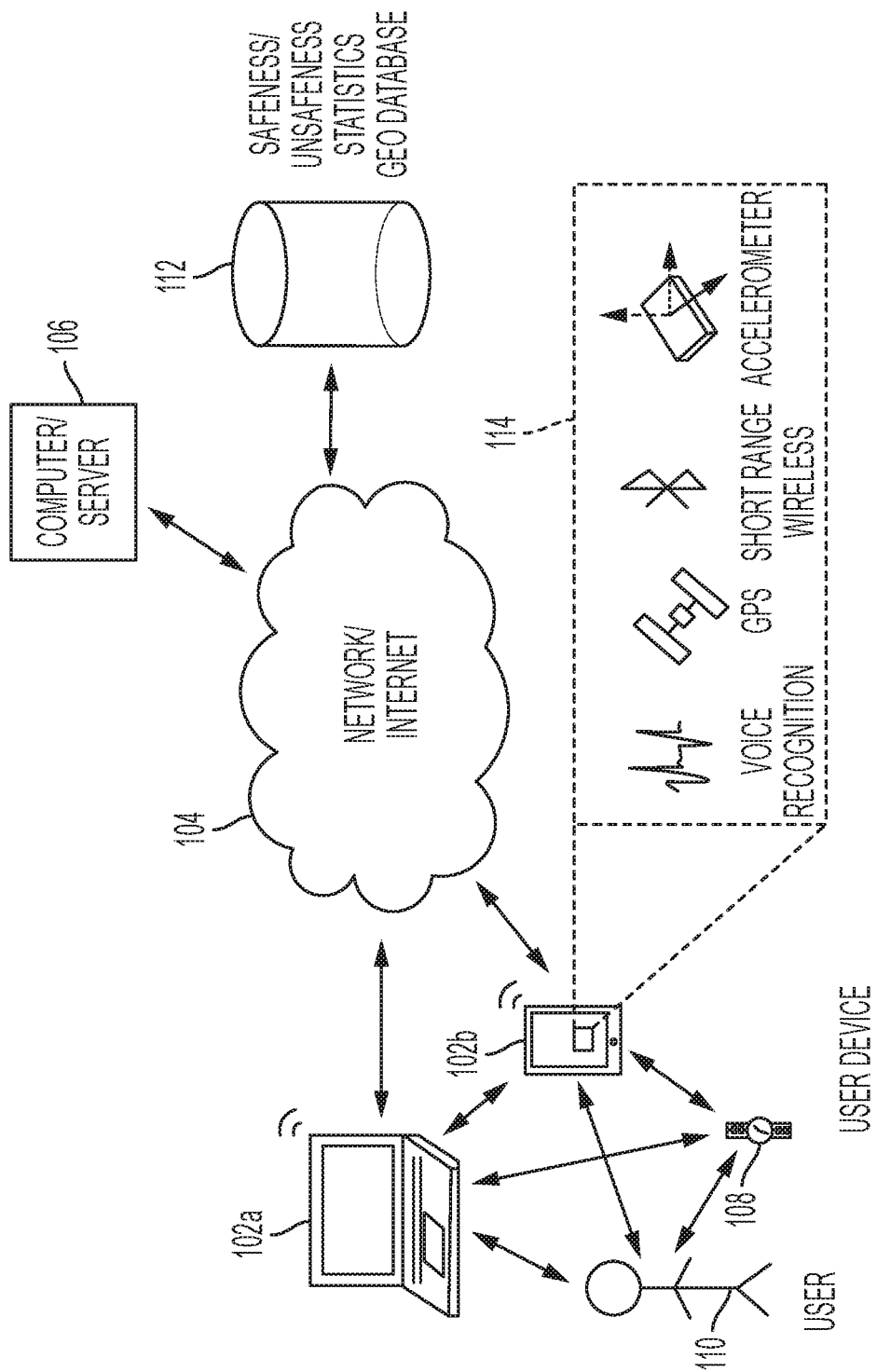
FIG. 1 is a diagram illustrating components of a system in one embodiment.

Systems, methods and techniques are provided in embodiments, which can provide automatic and/or customized data deletion, for example, on computer devices such as mobile devices. Examples of mobile devices may include but are not limited to a mobile phone, smart phone, a laptop, and/or another device (e.g., another computing device). In embodiments, system and/or method may detect a status of a mobile device, based on data received from multiple sensors and policy rules. In embodiments, depending on the detected device status, the system and/or method may use different levels of data deletion. Examples of device status may include lost, stolen, and forcibly taken.

For instance, a solution to handle deletion of data may depend on a determination of whether a mobile device was stolen or lost, or based on another status of the mobile device. In embodiments, the system and/or method may automatically identify or estimate the status of the mobile device if a device was stolen, lost, forcibly taken from the user against the user's will, and automatically act on data deletion according to one or more configurable policies and sensor data. In embodiments, the system and/or method may handle data deletion of a mobile device considering the tradeoff between data sensitivity and time to recover backup data to the user device (e.g., the mobile computing device).

In embodiments, the system and/or method may calculate or compute one or more triggers based on data generated by and received from a multitude of sensors to detect a status of a mobile device, for example, if a device was stolen, lost or taken forcibly. The system and/or method can also trigger and/or perform automatic device deletion based on an application of a customized policy. The system and/or method may consider levels of data deletion, based on the sensor data and a database of risky geographical areas, for example, for fast data recovery in case of a misinterpretation or ambiguity in the device status. For instance, the system and/or method may use data stored in a database of risky geographical areas, for example, indicating which geographic locations or areas are considered to be risky areas, to disambiguate an uncertainty in the detected device statue.

The system and/or method can prevent unauthorized access to data in a mobile device, in case the mobile device is lost, misplaced, stolen, and/robbed (e.g., forcibly taken from the user).

In embodiment, the system and/or method can handle deletion of data stored on a mobile device considering the following one or more features: map of areas with considerable chance of a device being stolen or taken (e.g., also referred to as risky areas); use of a multitude of sensors to detect whether the device is stolen, lost and/or taken forcibly; customizable data protection and/or deletion policies according the status of the mobile device and/or according to how the mobile device reached that status. The system and/or method in embodiments utilize techniques associated with, but not limited to, voice recognition, geographical database and associated statistics, signal processing, multiple sensors and time-aware deletion decisions.

A mobile device is considered to be stolen when someone takes the device without the device user's consent (e.g., pickpocketed). A mobile device is considered to be lost when the user is unable to find the device, but not necessarily because someone else took it. Robbing or forcible taking occurs when someone takes the mobile device by force from the device user or owner.

In an embodiment, levels of data deletion can include two types of data deletion: (i) soft deletion and (ii) full deletion. In soft deletion, the file system data access pointers are encrypted; the actual data is not deleted but it becomes inaccessible. For instance, in the File Allocation Table (FAT) file systems, the system and/or method can encrypt the FAT region (data access pointers) and make the data access unavailable. To recover the data, the system and/or method may decrypt the FAT region.

In full deletion, the system and/or method may delete or cause to delete file pointers and content. For instance, the system and/or method may fill or cause to fill the entire file system with zeros or ones to prevent information leaks.

FIG. 1 is a diagram illustrating components of a system in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

One or more user devices 102a, 102b can include a capability to automatically detect its status, for example, whether the device is stolen, lost and/or forcibly taken from its user. For instance, an app or application can be installed or deployed on a user device, e.g., on one or more of 102a, 102b, for detecting the status of a user device and deleting user data stored on the user device, for example, according to a predefined policy. As an example, the app can be downloaded from a server computer 106 or another computer, for example, via a computer network 104.

A set of sensors 114, also referred to as device sensors, can be used to detect the status of a device, e.g., 102a, for instance that the device is stolen, lost, forcibly taken. Examples of device sensors can include, but are not limited to, voice recognition device such as a microphone, location device such as a global positioning system (GPS) receiver, a short range wireless device such as a Bluetooth™ device, and an accelerometer. The set of sensors 114 can be coupled to the mobile device, e.g., 102a, for example, installed as part of the device 102a.

One or more wearable devices 108 may notify users about a missing user device, e.g., 102a, 102b. An example of a wearable device is a smart-keychain. Another wearable device can be used. A user device, e.g., 102a, 102b, can employ a wearable device 108 to detect user proximity. For instance, the user device 102b can detect whether a user's wearable device 108 is within threshold proximity of the user device 102b, for instance, using one or more techniques such as short range wireless technology, infrared technology, and/or another technique.

A geographic database 112 may store information associated with a plurality of geographic areas or locations. Information includes, for example, statistics related to the safety or riskiness of the area. For instance, information stored in the geographic database can include the probability associated with an area, the probability indicating how likely a device can be stolen or forcibly taken from its user 110 in the area.

In an embodiment, one or more machine learning algorithms can help the user to define trusted/not trusted areas and data deletion triggers.

Figure 2:
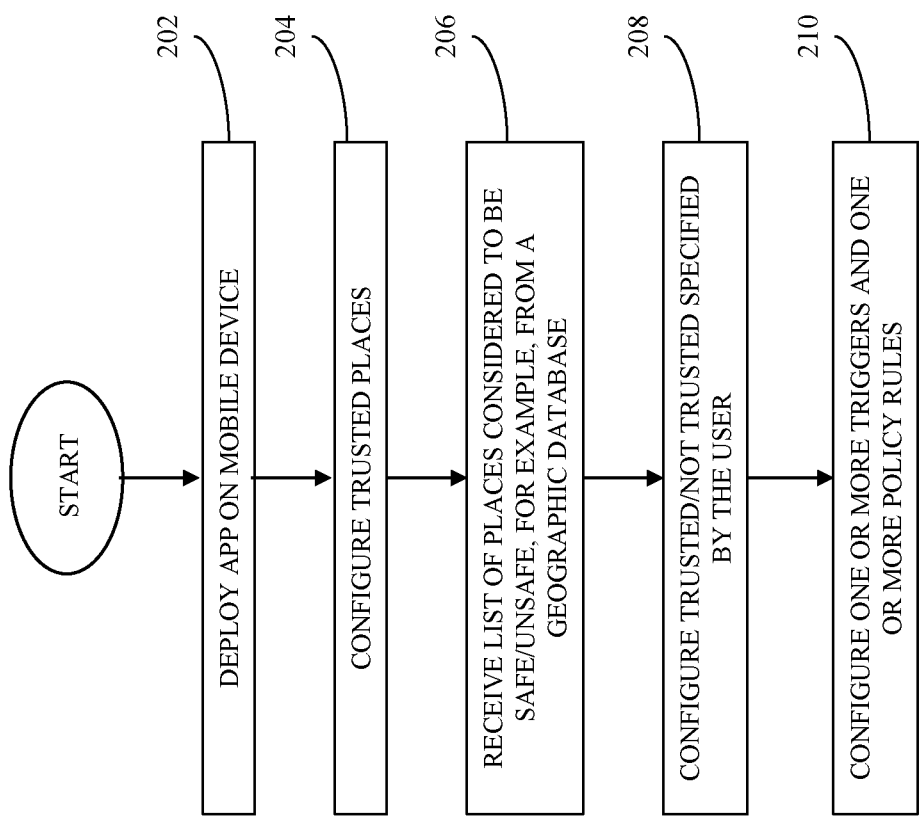
FIG. 2 is a diagram illustrating a method of configuring a mobile device to detect its status in one embodiment.

FIG. 2 is a flow diagram illustrating a method of configuring a mobile device to detect its status in one embodiment. The mobile device or a processor of the mobile device may perform one or more steps of the method. In another aspect, another computing device (e.g., using a web browser) which can synchronize its configuration with the mobile device may perform one or more steps of the method. At 202, an app or application can be downloaded to a mobile device and deployed.

At 204, the mobile device or the app running on the mobile device may configure trusted places or areas. For example, the app running on the mobile device can prompt a user to input (e.g., via a graphical user interface or user interface associated with the app or the mobile device) one or more trusted places. The app may store the input trusted places in its storage, for example, a database or table of trusted places. In another aspect, the app may retrieve or receive a list of trusted places from a database or storage, which may store such trusted places. For instance, such database or storage may be coupled with a server computer and communicated over a network, such as a computer network.

At 206, the app running on the mobile device may download (e.g., retrieve or receive) a list of places or areas considered to be unsafe, for example, from a geographic database. By way of example, such as a geographic database may be stored on a storage device coupled with a computer server, and the mobile device may communicate via a network with the geographic database to retrieve or receive the list of places or areas considered to be unsafe. The app may store the list of places or areas considered to be unsafe, received from the geographic database, in its storage.

At 208, the app running on the mobile device may also configure untrusted or not trusted places or areas entered or specified by the user. For instance, the app may prompt the user to input (e.g., via a graphical user interface or user interface associated with the app or the mobile device) one or more places or areas, which the user does not trust to be safe or consider to be unsafe. The app may also allow the user to modify or adjust the list received at 206. For instance, the app may present the list retrieved from the geographic database and allow the user to modify the list, for example, remove one or more places in the list. The app may store the user-input untrusted places in its storage, e.g., a database or table of user's untrusted places.

At 210, the app running on the mobile device may configure one or more triggers that activate data deletion and one or more policy rules that determine the type of deletion to be performed.

While the above description referred to an app or a mobile device performing one or more steps of the method shown in FIG. 2, another computing device (e.g., using a web browser) which can synchronize its configuration with the mobile device may perform one or more of the steps or processing shown in FIG. 2.

Figure 3:
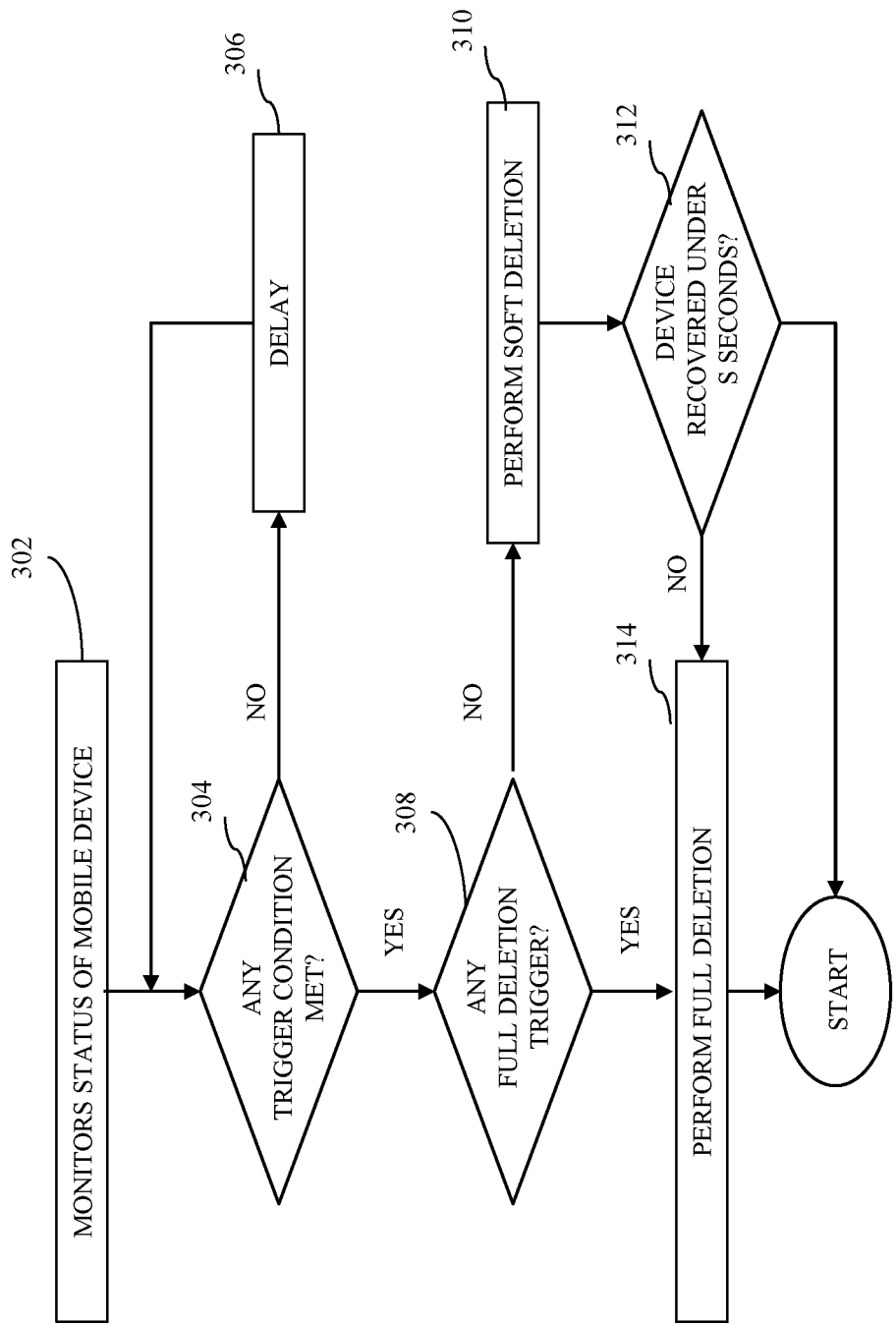
FIG. 3 is a flow diagram illustrating a method of automatic data deletion in one embodiment.

FIG. 3 is a flow diagram illustrating a method of automatic data deletion in one embodiment. At 302, a mobile device or an app running on the mobile device monitors the status of the mobile device, and at 304 checks whether any one or more trigger conditions (e.g., configured at 210 in FIG. 2) is met. The app or the mobile device may determine whether a trigger condition is met based on detecting the status of the mobile device and also one or more policy rules which can be configured.

If no trigger condition occurred or is met, then the mobile device may wait for a period of time at 306. The wait time or delay at 306 can be configured. After an expiration of the wait time, the mobile device at 304 may repeat checking for an occurrence of a trigger condition.

If a trigger condition is met, at 308, the app may determine whether the trigger condition is associated with full deletion or soft deletion mode.

If the trigger condition is associated with soft deletion, at 310, the app performs a soft deletion. After performing the soft deletion, the mobile device may wait for a configured amount or predefined period of time, which may be configured or predefined, for example, by a user, or automatically with a default value. The default value can be dynamic based on the current location of the mobile device. At 312, the app or the mobile device may check whether the soft deleted data has been recovered. After the expiration of the configured amount of time, if the soft deleted data has not been recovered, the app or the mobile device may perform a full deletion at 314. For example, the method considers automatically transitioning from a soft delete state (soft deletion) to a hard delete state (full deletion) based on time window of sensor data. In this way, for example, before the expiration of the configured amount of time, the app provides an option to the user to be able to recover the soft deleted data. Such recovery can be performed using a password or another authentication method. Automatically transitioning from a soft-delete state to a hard-delete state can occur based on a time window of collected sensor data, trigger policies, and associated sensor data.

If the trigger condition detected at 304 is associated with full deletion determined at 308, the app performs full deletion at 314.

Figure 4:
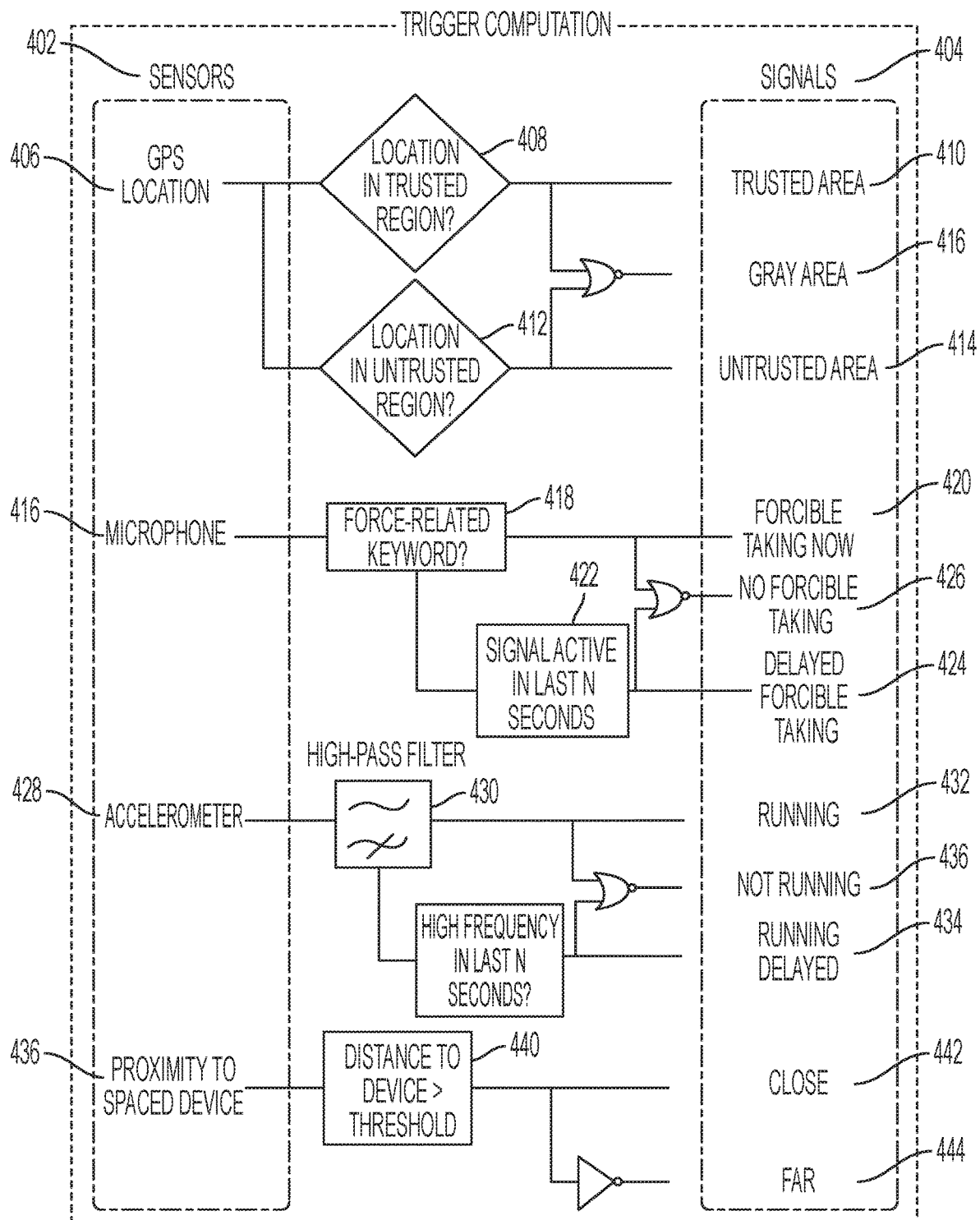
FIG. 4 illustrates a diagram illustrating trigger computation, for example, generating a signal indicating or detecting mobile device status in one embodiment.

FIG. 4 illustrates a diagram illustrating trigger computation, for example, generating a signal for indicating or detecting mobile device status in one embodiment. Each of multiple sensors 402 may contribute to a set of generated signals 404 for computing the deletion triggers. For example, information (e.g., location data) 406 from a location device or sensor such as a GPS receiver may be used to determine a type of an area or location. If at 408, the current location data of the mobile device, e.g., from the GPS receiver, indicates a location in a trusted region (e.g., configured based on user input and/or geographic database), then the app or the mobile device sets the signal 'trusted area' at 410. If at 412, the location is in an untrusted region, then the app or the mobile device sets the signal is 'untrusted area' at 414. If the location (e.g., per GPS signal 406) is not located in a trusted area and not located in an untrusted area, then the app or the mobile device sets the 'signal gray' area at 416.

A microphone or another sound sensor 416 can allow the app or the mobile device to use voice recognition to detect forcible taking commands. For instance, the app or the mobile device may have configured and/or stored one or more phrases associated with forcible taking in a database and may consider voice triggers based on keywords. Responsive to detecting a phrase associated with forcible taking at 418, the app or the mobile device sets the signal 'forcible taking now' at 420. At 422, that signal stays active for a given time (e.g., n seconds, where n is configurable) and during that period, the signal 'delayed forcible taking' is set and remains set at 424. If the signals 'forcible taking now' and 'delayed forcible taking now' are not active, the app or the mobile device sets the 'no forcible taking signal' at 426.

The mobile device or the app may also analyze accelerometer data from an accelerometer 428 to detect whether or not a person holding the mobile device is running or another active movement. An embodiment of this detection may use a high frequency filter 430 to evaluate the user movement. If high frequencies are detected, it can represent the situation where the person in possession of the mobile device is running. If the highpass filter 430 detects high frequencies, the signal 'running' 432 becomes active. Signal 'running delayed' 434 stays active for m seconds after 'running' signal activation, e.g., as shown at 432. If 'running' and 'running delayed' signals are not active, the app or the mobile device set the signal 'not running' at 436. Other one or more pattern recognition approaches can be used to detect running using accelerometer data.

The mobile device or the app also uses data such as proximity to wearable device 438 to generate a signal. If the distance from the user device (the mobile device) to a wearable device (e.g., worn by a user) is higher than a given threshold at 440, then the app or the mobile device sets signal 'close' at 442, otherwise the app or the mobile device activates or sets signal 'far' at 444. In an embodiment, wearables or wearable devices can be used to detect user device proximity (e.g., in estimating the distance between the user and the mobile device and generating the 'far', 'close' signals). Examples of wearable devices can include, but not limited to, a key chain with Bluetooth™ and/or radio frequency identification capabilities. The camera can also be used to detect known faces and/or places the user generally has contact with and generate a signal. In an embodiment, a system and/or method can pair multiple devices to detect proximity between owner and device 438 and use the detected proximity as an input for data deletion triggers.

Given the computed or generated signals 404, the app or the mobile device may use logic combination of the generated signals to detect the mobile device status. One or more policy rules, which may be preconfigured, may be used to determine the type of deletion to perform on the data stored on the mobile device. In an embodiment, the logic combination that detects the mobile device status can be defined by a user or automatically defined based on default logic.

The following illustrates examples of logic combinations for detecting mobile device status and policy rules of determine the type of deletion associated with the mobile device status.

Device Stolen=(gray area) AND (far) AND (running)/*device status is stolen if the generated signal is 'gray area' and 'far' and 'running'*/

Action (Device Stolen)=full deletion/*deletion to be performed associated with device status of stolen is full deletion */

Device Robbed=(delayed forcible taking) AND (running delayed)/*device status is robbed if the generated signal is 'delayed forcible taking' and 'running delayed'*/

Action (Device Robbed)=full deletion/*deletion to be performed associated with device status of robbed is full deletion */
Device Lost=(gray area) AND (far)/*device status is lost if the generated signal is 'gray area' and 'far'*/
Action (Device Lost)=soft deletion/*deletion to be performed associated with device status of lost is soft deletion */

In an embodiment, a set of templates (e.g., GUI templates) can be provided to the user to facilitate the creation of the trigger conditions associated with device status, and policy rules associated with setting the type of deletion or action. In another aspect, a GUI can allow a user to modify a given template.

Templates can include rules for determining the current device state based on generated signals. The same device state may be activated by different templates. For instance, the mobile device can be considered lost by one more templates. The templates can be pre-determined by the device's manufacturer and/or user-defined. The following illustrate examples of templates.

[TEMPLATE 1—DEVICE STOLEN]
Device Stolen=(gray area) AND (far) AND (running)/*device status is stolen if the generated signal is 'gray area' and 'far' and 'running'*/
[ACTION 1 FOR DEVICE STOLEN]
Action (Device Stolen)=full deletion/*deletion to be performed associated with device status of stolen is full deletion */
[TEMPLATE 2—DEVICE FORCIBLY TAKEN OR ROBBED]
Device Robbed=(delayed forcible taking) AND (running delayed)/*device status is robbed if the generated signal is 'delayed forcible taking' and 'running delayed'*/
[ACTION 2 FOR DEVICE FORCIBLY TAKEN OR ROBBED]
Action (Device Robbed)=full deletion/*deletion to be performed associated with a device status of robbed is full deletion */
[TEMPLATE 3—DEVICE LOST]
Device Lost=(gray area) AND (far)/*device status is lost if the generated signal is 'gray area' and 'far'*/
[ACTION 3 FOR DEVICE LOST]
Action (Device Lost)=soft deletion/*deletion to be performed associated with a device status of lost is soft deletion */

The way the user utilizes the mobile device can also be used as a signal for the formation of triggers templates. A system in an embodiment can analyze the programs the user generally uses, how long and what times the user uses the programs to generate usage patterns for a given user. In another aspect, signals can be created in other ways. For instance, a signal can be created by inspecting how the user manipulates the mobile device. For instance, a device usage behavior can be associated with a user. By way of example, this usage behavior can be detected by a pattern recognition technique. Responsive to detecting a different behavior (e.g., a deviation from a recognized pattern), the mobile device (or another device synchronized with the mobile device) can generate a signal. For instance, a recognized behavior pattern may include a user opening application A, B, C, and D during x, y, z, w times during the day of weekdays. When a different combination of applications or times is detected, the mobile device can activate a signal representing a different usage behavior for the device.

Figure 5:
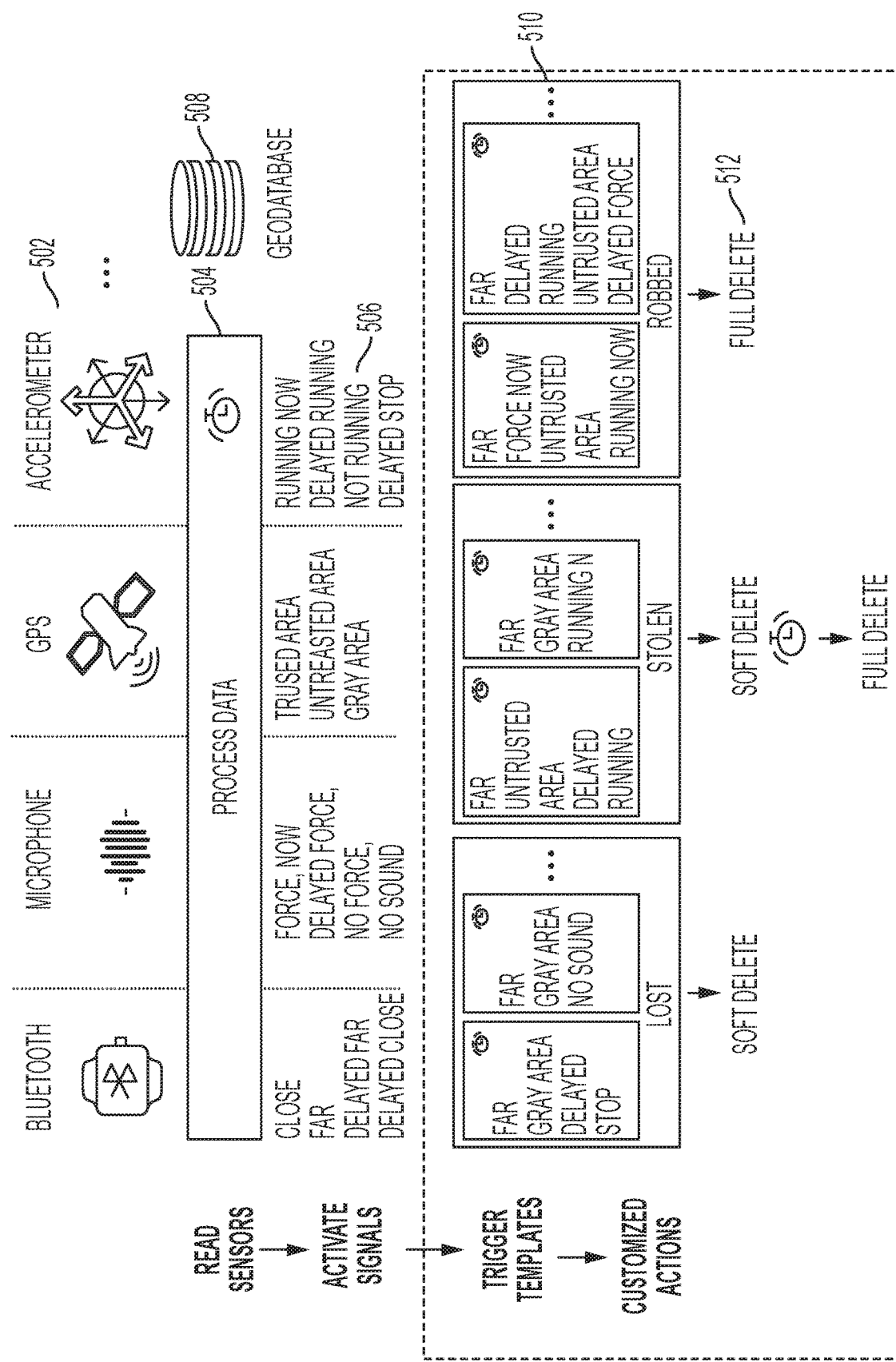
FIG. 5 is a diagram illustrating an overview of a system and component interactions in one embodiment.

FIG. 5 is a diagram illustrating an overview of a system and component interactions in the system in one embodiment. A plurality of sensors 502 may be embedded or deployed on a mobile device and generate readings. Examples of such sensors may include, but not limited to, a short range wireless device such as a Bluetooth™ device, a microphone that detects sound such as voice, location device such as a GPS receiver, and an accelerometer that detects change in motion. An app on a mobile device may read and process at 504 the sensor data (e.g., as described with reference to FIG. 4) and generate or activate signals 506 used for detecting a mobile device status. The app or the mobile device may also use data from a geographic database 508 indicating whether a location is considered safe or unsafe to generate a signal 506. The app or the mobile device may determine whether a trigger condition is met (e.g., as in 304 in FIG. 3), based on one or more trigger templates or policies 510. A trigger template 510 specifies a logic combination of generated signals for indicating a mobile device status. Customized actions 512 or policies can specify a type of action (e.g., soft delete, full delete) based on the mobile device status. A delete action can be performed based on a customized action policy 512.

Figure 6:
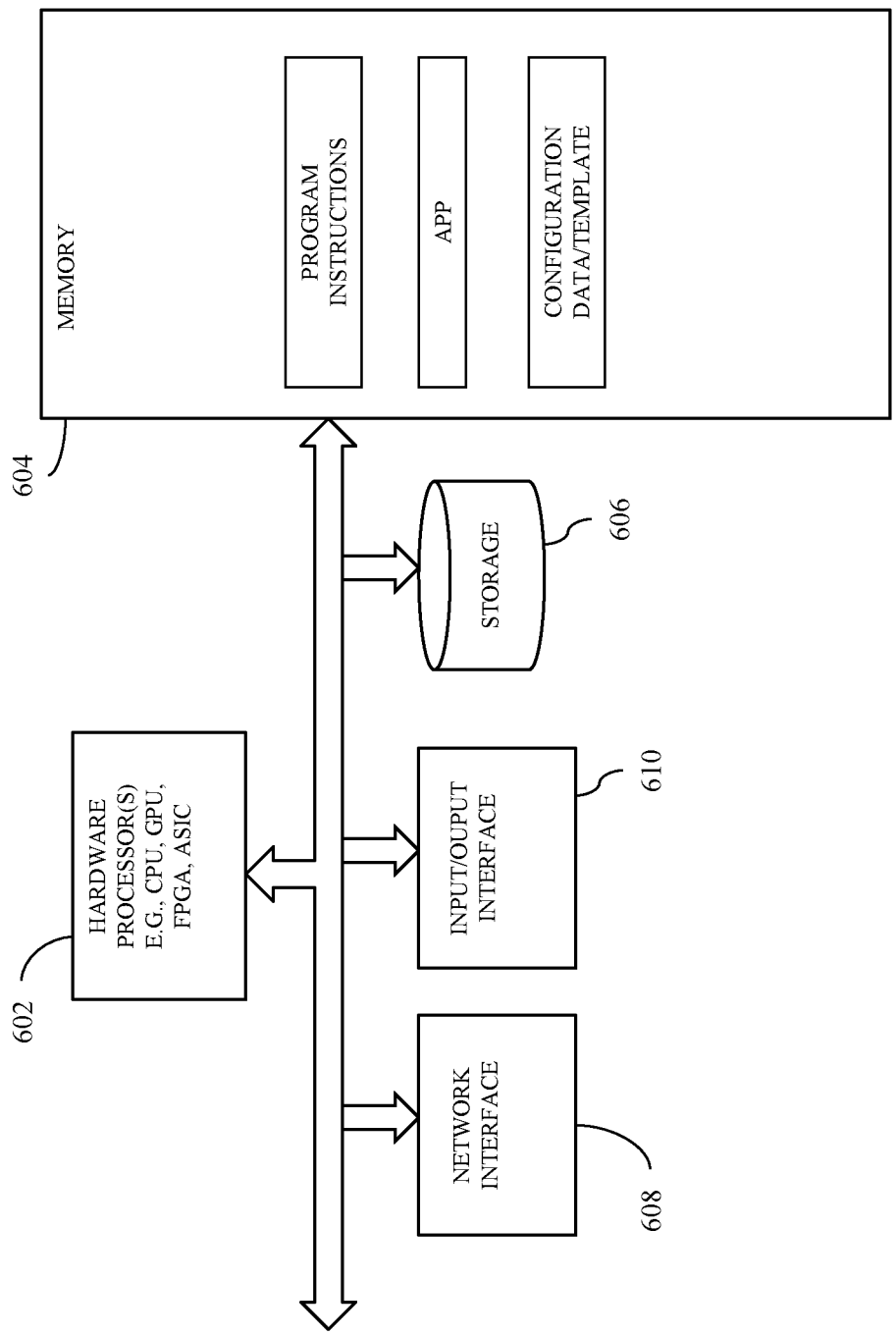
FIG. 6 is a diagram illustrating components of a system, which can perform automatic data deletion in one embodiment.

FIG. 6 is a diagram illustrating components of a system that can perform automatic data deletion in one embodiment. The system may be a part of a mobile device. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a plurality of signals based on sensor data received from a plurality of sensors associated with the mobile device. Based on a logic combination of the plurality of signals, one or more hardware processors 602 may detect a mobile device status indicating one of different scenarios. Based on the detected mobile device status and a configured policy, one or more hardware processors 602 may determine a type of deletion action for deleting data on the mobile device. One or more hardware processors 602 may perform the determined type of deletion action.

A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 (e.g., a mobile app) or received from another computer device or medium. A memory device 604 may, for example, store instructions and/or data for functioning of one or more hardware processors 602, and may include an operating system and other program of instructions and/or data. In one aspect, an app and configuration data may be stored in a storage device 606 or received via a network interface 608 from a remote device, and may be temporarily loaded into a memory device 604 for detecting mobile device status and determining a deletion action. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
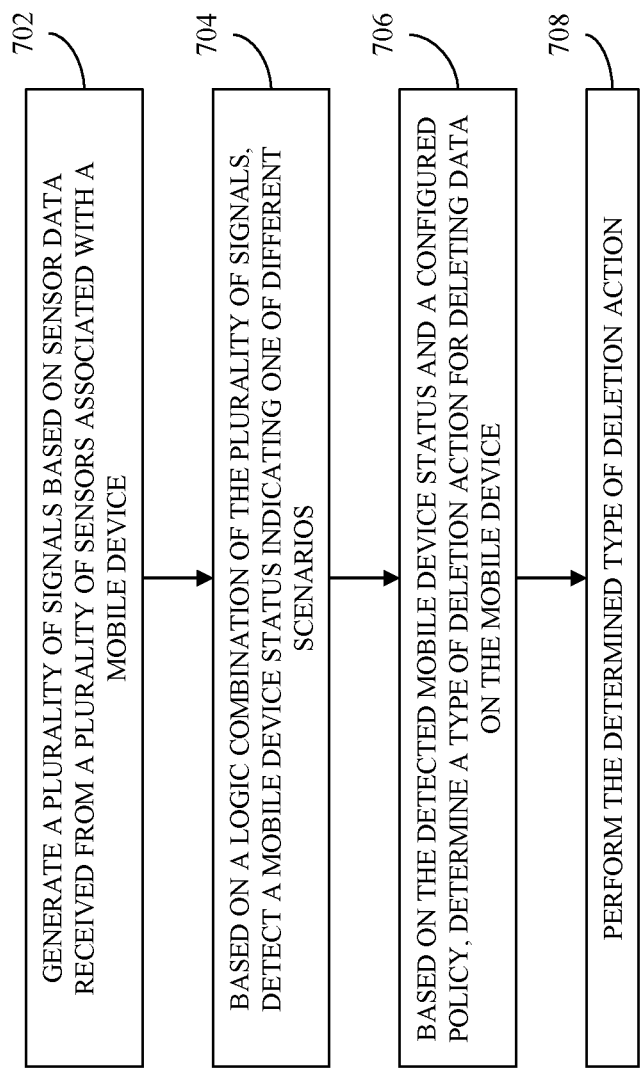
FIG. 7 is a flow diagram illustrating a method in one embodiment.

FIG. 7 is a flow diagram illustrating a method in one embodiment. The method can be performed by one or more hardware processors. At 702, the method includes generating a plurality of signals based on sensor data received from a plurality of sensors associated with a mobile device.

At least one of the plurality of signals can be generated based on a proximity distance between the mobile device and a wearable device of a user of the mobile device. The proximity distance can be detected by pairing the mobile device and the wearable device. At least one of the plurality of signals can be generated based on a voice keyword. At least one of the plurality of signals can be generated based on automatically considering safeness of an area indicated by a geographic database. For example, the sensor data based on which the plurality of signals are generated can include GPS location data, voice data, accelerometer data and proximity to a wearable device of a user of the mobile device.

At 704, the method includes, based on a logic combination of the plurality of signals, detecting a mobile device status indicating one of different scenarios. Different scenarios can include that the mobile device is lost, stolen and forcibly taken. Logic combination of the plurality of signals for detecting the mobile device status can be configurable.

At 706, the method includes, based on the detected mobile device status indicating one of different scenarios and a configured policy, determining a type of deletion action for deleting data on the mobile device. The type of deletion action determined can be different for the different scenarios. For instance, different scenarios (e.g., lost, stolen, forcibly taken) can be treated differently. The type of deletion action can include a full deletion. The type of deletion action can include a soft deletion. Soft deletion can include encrypting the data on the mobile device, wherein the data is recoverable. The configured policy can be customized per user.

Figure 8:
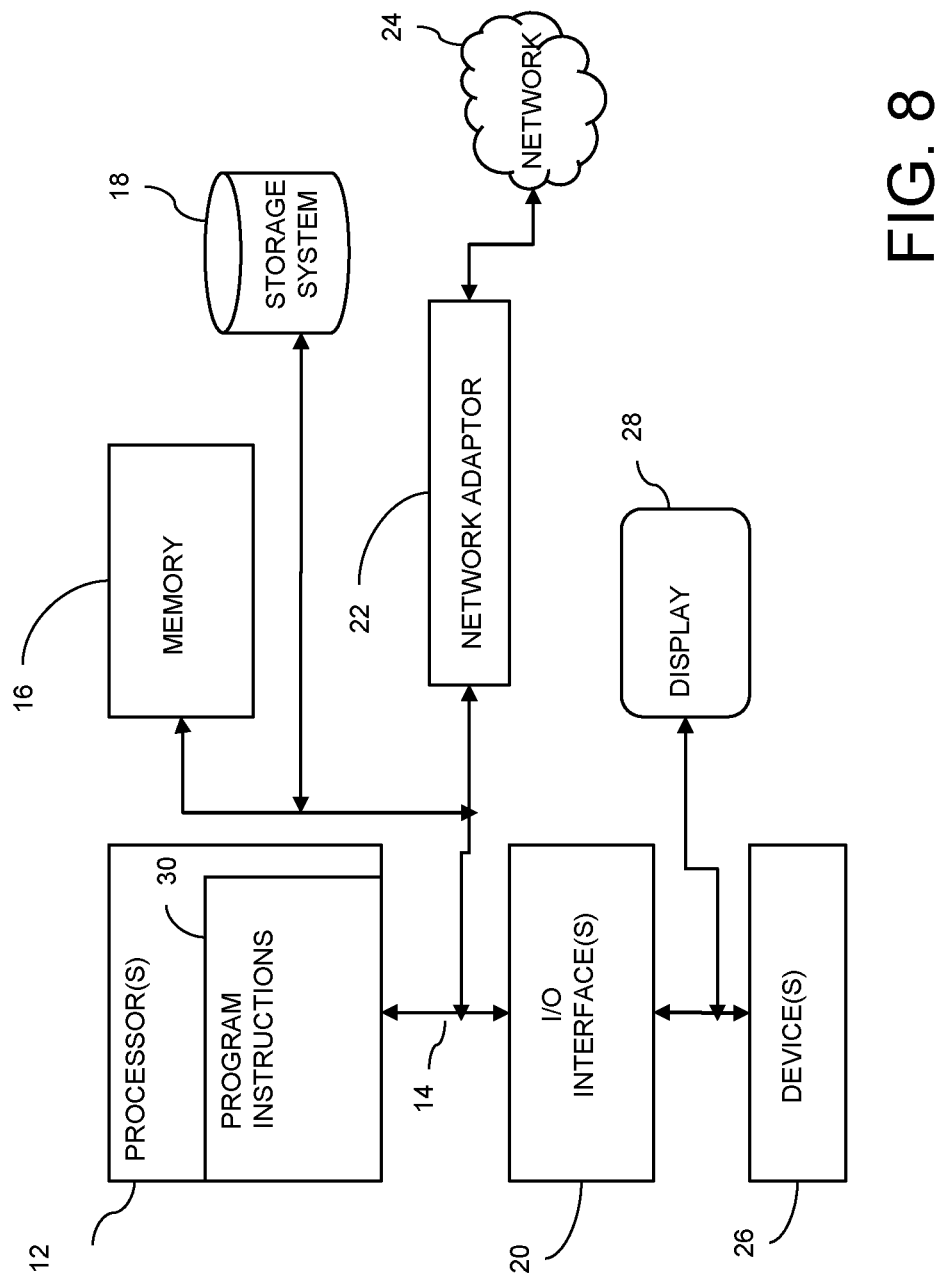
FIG. 8 illustrates a schematic of an example computer or processing system that may implement a system in one embodiment of the present disclosure.

FIG. 8 illustrates a schematic of an example computer or processing system that may implement a system or at least a part of a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
generating a plurality of signals based on sensor data received from a plurality of sensors associated with a mobile device;
based on a logic combination of the plurality of signals, detecting a mobile device status indicating one of different scenarios;
based on the detected mobile device status which indicates one of different scenarios and a configured policy, determining a type of deletion action for deleting data on the mobile device, wherein the type of deletion action determined is different for the different scenarios;
transitioning from the type of deletion action to another type of deletion action based on a time window, wherein amount of time of the time window is dynamically configured based on current location of the mobile device; and
performing the determined type of deletion action.

2. The method of claim 1, wherein at least one of the plurality of signals is generated based on a proximity distance between the mobile device and a wearable device of a user of the mobile device, the proximity distance detected by pairing the mobile device and the wearable device.

3. The method of claim 1, wherein at least one of the plurality of signals is generated based on a voice keyword.

4. The method of claim 1, wherein at least one of the plurality of signals is generated based on automatically considering safeness of an area indicated by a geographic database.

5. The method of claim 1, wherein the type of deletion action includes a full deletion.

6. The method of claim 1, wherein the type of deletion action includes a soft deletion.

7. The method of claim 1, wherein the soft deletion includes encrypting the data on the mobile device, wherein the data is recoverable.

8. The method of claim 1, wherein the different scenarios include lost, stolen and forcibly taken.

9. The method of claim 1, wherein the configured policy is customized per user.

10. The method of claim 1, wherein the logic combination of the plurality of signals for detecting the mobile device status is configurable.

11. The method of claim 1, wherein the sensor data based on which the plurality of signals is generated includes at least GPS location data, voice data, accelerometer data and proximity to a wearable device of a user of the mobile device.

12. A mobile device comprising:
a processor; and
a memory device coupled with the processor;
the processor operable to at least:
generate a plurality of signals based on sensor data received from a plurality of sensors associated with a mobile device;
perform a logic combination of the plurality of signals;
based on the logic combination of the plurality of signals, detect a mobile device status indicating one of different scenarios;
based on the detected mobile device status which indicates one of different scenarios and a configured policy, determine a type of deletion action for deleting data on the mobile device, wherein the type of deletion action determined is different for the different scenarios; and
perform the determined type of deletion action,
wherein the processor is operable to transition from the type of deletion action to another type of deletion action based on a time window, wherein amount of time of the time window is dynamically configured based on current location of the mobile device.

13. The mobile device of claim 12, wherein the plurality of sensors includes at
least a GPS receiver, a microphone, a short range wireless device, and an accelerometer.

14. The mobile device of claim 12, wherein the processor is operable to generate at least one of the plurality of signals based on a proximity distance between the mobile device and a wearable device of a user of the mobile device, the proximity distance detected by pairing the mobile device and the wearable device.

15. The mobile device of claim 12, wherein the processor is operable to generate at least one of the plurality of signals based on a voice keyword.

16. The mobile device of claim 12, wherein the processor is operable to generate at least one of the plurality of signals based on automatically considering safeness of an area indicated by a geographic database.

17. The mobile device of claim 12, wherein the type of deletion action includes
a soft deletion wherein the processor is operable to encrypt the data on the mobile device, wherein the data is recoverable.

18. A computer program product comprising a computer readable storage medium having program instructions embodied therewith, the program instructions executable by a device to cause the device to:
generate a plurality of signals based on sensor data received from a plurality of sensors associated with a mobile device;
based on a logic combination of the plurality of signals, detect a mobile device status indicating one of different scenarios;
based on the detected mobile device status which indicates one of different scenarios and a configured policy, determine a type of deletion action for deleting data on the mobile device, wherein the type of deletion action determined is different for the different scenarios; and
perform the determined type of deletion action,
wherein the device is caused to transition from the type of deletion action to another type of deletion action based on a time window, wherein amount of time of the time window is dynamically configured based on current location of the mobile device.

* * * * *